(12) United States Patent  (10) Patent No.: US 9,001,230 B2
Jirman  (45) Date of Patent: Apr. 7, 2015

(54) SYSTEMS, METHODS, AND COMPUTER-READABLE MEDIA FOR MANIPULATING IMAGES USING METADATA

(71) Applicant: Apple Inc., Cupertino, CA (US)

(72) Inventor: Stan Jirman, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/065,149

(22) Filed: Oct. 28, 2013

(65) Prior Publication Data

US 2014/0118395 A1  May 1, 2014

Related U.S. Application Data

(63) Continuation of application No. 13/081,277, filed on Apr. 6, 2011, now abandoned.

(51) Int. Cl.
*H04N 5/228* (2006.01)
*G06T 3/40* (2006.01)
*G06T 11/00* (2006.01)
*G09G 5/00* (2006.01)

(52) U.S. Cl.
CPC . *G06T 3/40* (2013.01); *G06T 11/00* (2013.01); *G09G 5/00* (2013.01); *G06T 2210/22* (2013.01)

(58) Field of Classification Search
CPC ........ G06T 11/00; G06T 3/40; G06T 2210/22; G09G 5/00
USPC ............ 348/222.1, 231.3; 345/661, 619, 634, 345/629, 660
See application file for complete search history.

(56) References Cited

U.S. PATENT DOCUMENTS

| | | |
|---|---|---|
| 8,031,914 B2 | 10/2011 | Zhang |
| 8,116,535 B2 | 2/2012 | Nozawa |
| 8,584,160 B1 | 11/2013 | Huang et al. |
| 2005/0090730 A1 | 4/2005 | Cortinovis et al. |
| 2005/0134719 A1 | 6/2005 | Beck |
| 2008/0088717 A1 | 4/2008 | Isomura |
| 2009/0322775 A1 | 12/2009 | Fukuda |
| 2012/0257072 A1 | 10/2012 | Jirman |
| 2012/0307096 A1* | 12/2012 | Ford et al. .................. 348/222.1 |
| 2013/0083977 A1 | 4/2013 | Jackson |

(Continued)

OTHER PUBLICATIONS

"U.S. Appl. No. 13/081,277, Non Final Office Action mailed Jun. 27, 2013", 10 pgs.

(Continued)

*Primary Examiner* — Antoinette Spinks
(74) *Attorney, Agent, or Firm* — Schwegman Lundberg & Woessner, P.A.

(57) ABSTRACT

Many cameras have the ability to capture an image and generate metadata associated with the image. Such image metadata may include focus point metadata information that may be indicative of the potential focus points available to the camera as well as which one or more of those potential focus points were utilized to capture the image. As the location of a focus point used during image capture is generally intended to coincide with the location of the photographer's main area of interest within the image, such focus point metadata can be accessed during image editing and used to zoom in to the captured image at that focus point location. Performing a "smart-zoom" based on an image's focus point metadata may save time and reduce frustration during the image editing process.

24 Claims, 10 Drawing Sheets

(56) References Cited

U.S. PATENT DOCUMENTS

| | | |
|---|---|---|
| 2013/0108122 A1 | 5/2013 | Ptucha |
| 2013/0169853 A1 | 7/2013 | Luong |
| 2013/0243269 A1 | 9/2013 | Jankowski et al. |
| 2013/0272609 A1 | 10/2013 | Sun et al. |
| 2014/0104477 A1* | 4/2014 | Choi et al. ............... 348/333.05 |

OTHER PUBLICATIONS

"U.S. Appl. No. 13/081,277, Response filed Apr. 17, 2013 to Restriction Requirement mailed Mar. 20, 2013", 8 pgs.

"U.S. Appl. No. 13/081,277, Restriction Requirement mailed Mar. 20, 2013", 6 pgs.

* cited by examiner

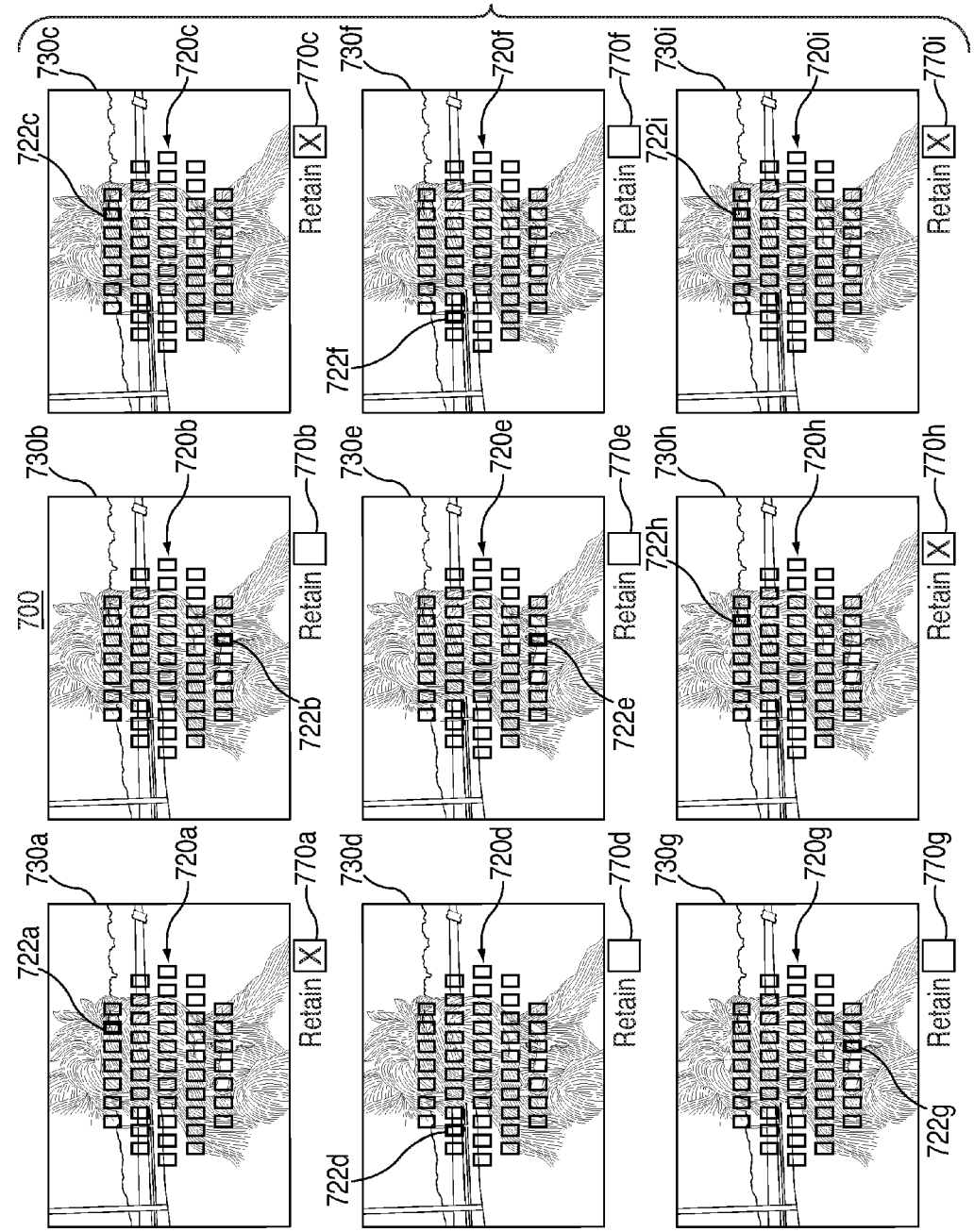

SYSTEMS, METHODS, AND COMPUTER-READABLE MEDIA FOR MANIPULATING IMAGES USING METADATA

FIELD OF THE INVENTION

This can relate to systems, methods, and computer-readable media for manipulating images and, more particularly, to systems, methods, and computer-readable media for manipulating images using metadata.

BACKGROUND OF THE DISCLOSURE

The advent of high quality digital cameras has enabled professional and novice photographers alike to capture and edit images in ways that were unthinkable just a short time ago. Modern day cameras abound with features, including autofocus, image stabilization, and face detection, that are designed to make every shot picture-perfect. As photographers working with digital cameras no longer need to have each picture developed, there can be a tendency to take far more pictures than one would have previously taken with a conventional film camera, where every picture taken costs a specific amount of money to develop.

One of the results of all these trends is that a user (e.g., an image editor) may often have to interact with an image processing system to sift through a large number of digital images to find the few images that are worth retaining. However, currently available image processing systems may not adequately provide image manipulation techniques, such as image zooming, that can allow image editors to easily review large numbers of digital images.

SUMMARY OF THE DISCLOSURE

Systems, methods, and computer-readable media for manipulating images using metadata are disclosed. In some embodiments, systems, methods, and computer-readable media are disclosed for performing smart-zoom manipulation on images using metadata. An image can include among its associated metadata, focus point metadata information, which may be indicative of the position of one or more focus points utilized to capture the image. For example, a camera or any other suitable imager used to capture an image may be provided with any suitable pattern of potential focus points, one or more of which may be activated or otherwise utilized when capturing an image. As just one particular example, a camera may include a set of forty-five focus points that may be arranged in a pattern of 7, 10, 11, 10, 7, where each number may represent the number of focus points in each of five rows forming a diamond pattern of potential focus points. Any one or more of those forty-five focus points may be utilized as an active point of focus when capturing an image. In many instances, one might assume that the active focus point would be positioned at the center of the image (e.g., the sixth focus point in the row with eleven focus points in the above example). However, that is often not the case. In many instances, a camera may utilize a focus point that is not positioned at the center of the pattern of potential focus points, such that the in-focus object of a captured image may not be positioned in the center of the image.

An image processing system may access captured images and display the images to a user such that the user may view and edit the images. In some embodiments, the image processing system may download the images from a distinct imager, while, in other embodiments, a camera or any other suitable imager may be provided with an image processing system such that a user may view and edit images on the imager itself. A captured image may be displayed in full within a display window (i.e., "scaled-to-fit"), such that the entire content of the image may be viewed by the user. An image may also be displayed zoomed-in about a particular smart-zoom point that may be determined by the focus point metadata associated with the image. The term "smart-zoom" may refer to any manipulation that may center the zoom area of an image about a point (e.g., a "smart-zoom point") that may be determined by the focus point metadata associated with the image. Generally, when an image is zoomed-in, only a portion of the image may be displayed to the user within a display window. Accordingly, in some instances, an image displayed at its native resolution (i.e., 1× or 100%) may be considered zoomed-in if the entire image does not fit within the display window.

An image may be displayed as zoomed-in about a particular smart-zoom point automatically or at the request of a user. A smart-zoom point may be the position of a particular focus point utilized by the camera when capturing the image, as may be indicated by the focus point metadata information associated with the image. The smart-zoom point may also, in some embodiments, be chosen from among several utilized focus points or otherwise calculated based upon the focus point metadata. By displaying a zoomed-in portion of a captured image based on the focus point metadata associated with the image, a user may more easily determine whether or not the captured image is worth retaining or editing in some way.

In some embodiments, a user can start with a scaled-to-fit view of an image captured by a camera. In these and other embodiments, a number of features may be provided by the image processing system for purposes of enhancing the viewing and editing process of the user. For example, a representation of the array of potential focus points available to the imager that captured the image may be overlaid on the displayed image, and the one or more particular focus points of the array actually used by the imager to capture the image can be highlighted in the overlaid representation in order to quickly and clearly display the position of the one or more focus points of the captured image to the user. In this way, a user may easily determine both whether the content of the entire image is desirable and whether the in-focus portion of the image is positioned correctly with respect to a particular subject of the image. The user may then zoom-in to the focus point for a more detailed view of the subject. Alternatively, the image may initially be presented to the user as smart-zoomed in to a point based on the focus point metadata associated with the image, such that the user may immediately determine whether or not the in-focus portion of the image is positioned correctly with respect to the content of the image. In some embodiments, a user may also view a thumbnail of the full image while in a zoomed-in mode. The thumbnail view option may be beneficial, for instance, to give the user the full context of the image while in a zoomed-in mode. The focus point overlay, zoom, and thumbnail view options can, in some embodiments, be implemented as buttons or keyboard shortcuts to allow the user to efficiently proceed through a set of captured images.

The user may also view a set of images in an array according to some embodiments. An array view may be useful, for example, for sorting through a large number of images at once. If the images are displayed with their focus point arrays, a user may be able to quickly determine which images are likely to be in focus on the intended subjects. The user can then tag those images for further viewing and editing. Tagging an image may, for example, require the user to click a check box.

In some embodiments, an image processing system may be configured to recognize a particular subject within an image and its particular position with the image (e.g., by utilizing a subject recognition algorithm). For example, an image processing system may be configured to detect the position of a subject's face within a captured image (e.g., as provided by the face recognition feature available in iPhoto™ by Apple Inc. of Cupertino, Calif.). Such image subject recognition may be employed in conjunction with focus point metadata by an image processing system to make educated guesses about which images are likely to be worth retaining. As an example, if a focus point of an image overlaps or is within a specific distance from a detected face within the image, an image processing system may determine that the image is probably focused correctly and worth retaining. In such embodiments, the system may automatically prioritize that image for further viewing/editing.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which:

FIG. 7 is view of a display window of an image processing system showing multiple images with focus point overlays according to at least one embodiment;

DETAILED DESCRIPTION OF THE DISCLOSURE

Systems, methods, and computer-readable media for manipulating images using metadata are provided and described with reference to FIGS. 1-10.

An image processing system may be configured to allow a user to view images in either a "scaled-to-fit" mode or at a particular, fixed, zoom level (e.g., 1× or 2×). The user may also be provided with the ability to switch back and forth between these two modes using a keyboard "shortcut" (e.g., 'z' or 'Ctrl-+'), a menu option, a mouse gesture, or any other suitable option. In the case of the keyboard shortcut, the image may simply be zoomed by a predetermined zoom level about the center of the image, even though the center may often not be the photographer's primary area of interest and/or the in-focus portion of the image. In the case of the mouse gesture, the image can be zoomed to the location of a mouse click on the image. While this approach may be somewhat of an improvement, it relies on the user trying to guess what the photographer's area of interest was and/or to determine the in-focus portion of the image while also requiring precise aim by the user. Incorrect or imprecise zooming can be very frustrating and time consuming for a user working with a large number of high resolution images. According to some embodiments, systems, methods, and computer-readable media are provided for zooming or otherwise manipulating an image using metadata associated with the image, such a focus point metadata.

Many high quality cameras in the market today have auto-focus capability, and many of the cameras currently on the market may provide the photographer with the ability to choose a particular focus point from an ever growing number of potential focus points available to the camera. Depending on the camera, there may be only one potential focus point or an array of up to forty-five or more potential focus points. A photographer may manually choose one or more of the potential focus points to be utilized for capturing a particular image or the camera may automatically do so.

Cameras may also be configured to generate and save "metadata," or data about a captured image, along with the captured image. Image metadata may include information regarding, for example, who owns the photo, the exposure information, keywords about the image, date, time and location data, and the like. Some cameras may also have the ability to record which of its potential focus points were used to capture the image as focus point metadata. As the location of the one or more focus points actually used during image capture may coincide with each portion of the image that is in-focus, the focus point metadata can be accessed during image editing and can then be used to identify that location on the captured image to a user and/or to zoom in to that location of the captured image. Performing a "smart-zoom" based on an image's focus point metadata may beneficially save time and reduce frustration during the image editing process.

Figure 1:
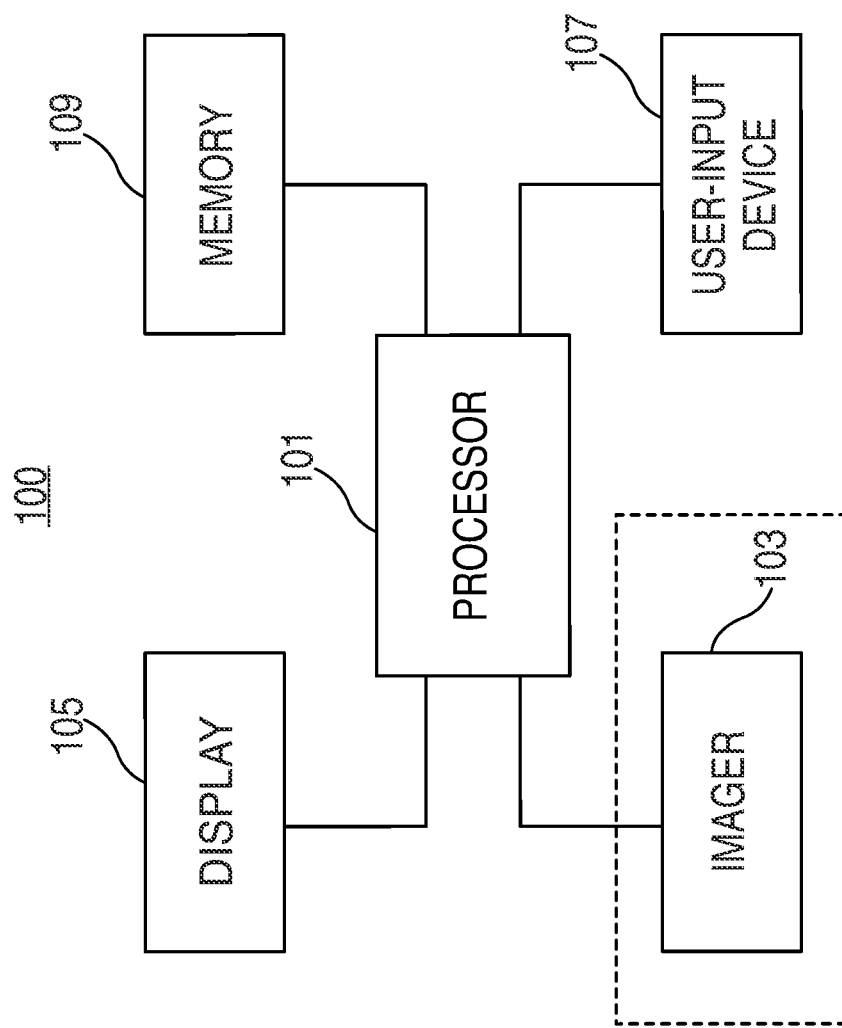
FIG. 1 is a schematic view of an image processing system according to at least one embodiment.

FIG. 1 is a schematic view of an image processing system 100 according to at least one embodiment. System 100 may include a processor 101, a display 105, a user-input device 107, and a memory 109. System 100 may also optionally include an imager 103. Processor 101 may be included within, for example, a computer or any other suitable electronic device that can store or otherwise access images captured by imager 103. Imager 103 can be any device (e.g., a digital SLR camera) capable of capturing images along with focus point metadata. A user can import images to memory 109 coupled to processor 101 from imager 103. Alternatively, images may be downloaded, obtained, or otherwise accessed by processor 101 from any other suitable source. Processor 101 may include any processing circuitry operative to control the operations and performance of one or more components of image processing system 100. In some embodiments, processor 101 may be used to run operating system applications, firmware applications, or any other suitable application or program, such as an image editing application (e.g., iPhoto™ and/or Aperture™ by Apple Inc. of Cupertino, Calif.), that may be configured to manipulate an image based on one or more predetermined parameters (e.g., focus point metadata). For example, processor 101 may load a user interface program or other application program (e.g., a program stored in memory 109 or on another device or server) to determine how certain data may be manipulated on certain components (e.g., how image data may be manipulated on display 105). Display 105 may be coupled to processor 101 and may provide a user with a visual interface for viewing and potentially editing captured images. User-input device 107 may be any device suitable to allow a user to interact with processor 101. For example, user-input device 107 may be a keyboard and/or a mouse. In some embodiments, display 105 and user-input device 107 may be a single component, such as a touch screen, that may receive input information through a user's touch of a display screen and that may also provide visual information to a user via that same display screen. In some embodiments, all elements of system 100 may be encapsulated in a single device (e.g., a camera).

Figure 2:
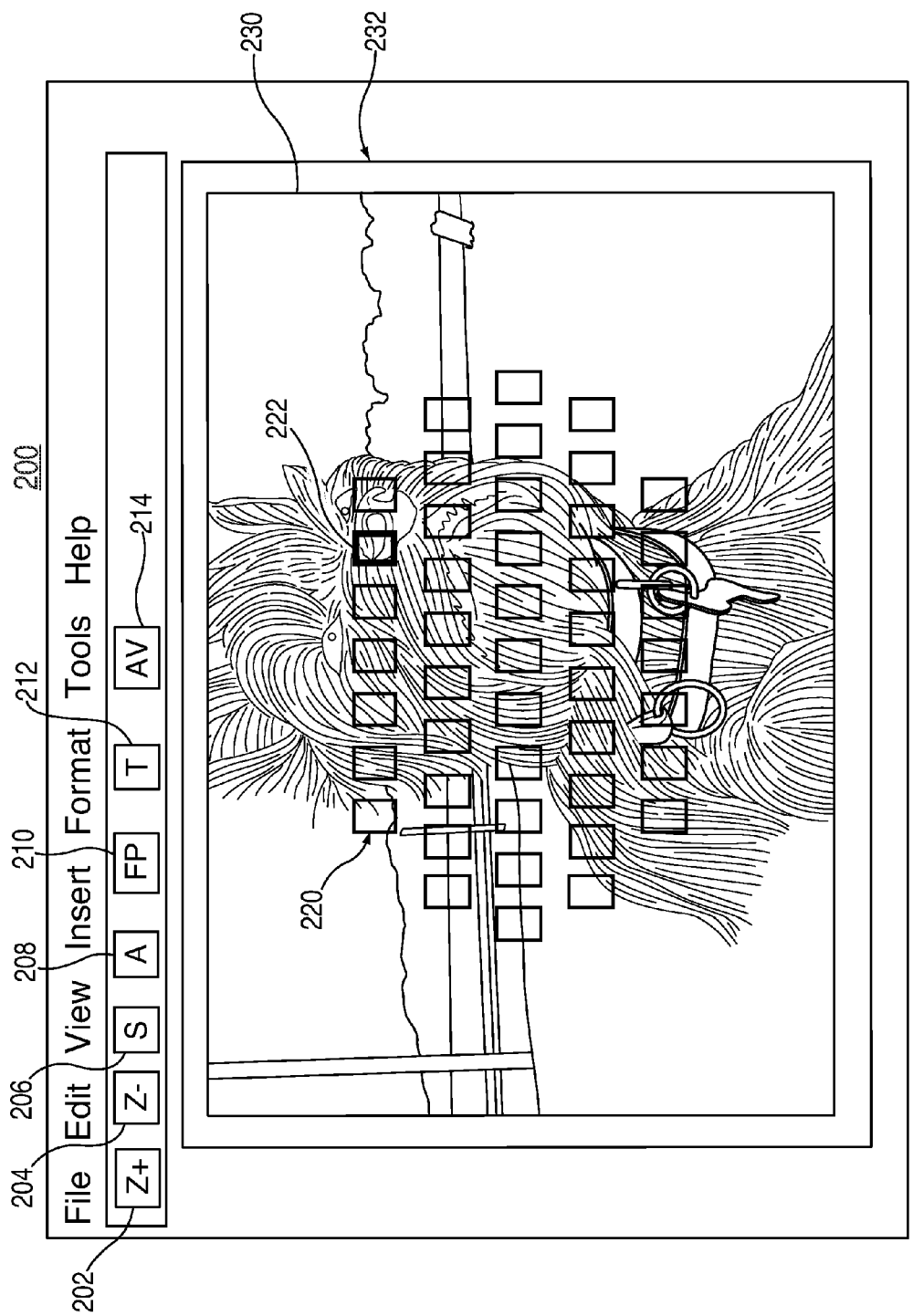
FIG. 2 is a user-interface of an image processing system for viewing images according to at least one embodiment.

FIG. 2 shows an example of a user-interface 200 that may be provided by an image processing system (e.g., system 100) to a user for viewing and editing images according to one or more embodiments. In some embodiments, user-interface 200 may be provided to a user by display 105 of system 100 and may include an image viewing window or an image display window 232, a zoom-in button 202, a zoom-out button 204, a smart-zoom toggle button 206, an auto-zoom toggle button 208, a focus point overlay toggle button 210, a thumbnail toggle button 212, and/or an array-view toggle button 214. Persons skilled in the art will appreciate that some of these buttons may be optional, and that other buttons/ functions can be added. An image 230 may be displayed in window 232 to a user for the purposes of viewing and/or editing. Although user-interface 200 shows buttons 202, 204, 206, 208, 210, 212, and 214, the functions associated with each button can be implemented in various other suitable ways. For example, keyboard shortcuts may be available instead of, or in addition to, buttons 202, 204, 206, 208, 210, 212 and 214. In addition, not all of the functions are required for some embodiments.

Zoom-in button 202 may allow a user to zoom in on image 230 by a predetermined zoom factor. For example, if the current view mode is 1× (or 100%), pressing zoom-in button 202 may increase the zoom to, for example, 2× (or 200%). Further activations of zoom-in button 202 may, for example, increase the zoom to 4×, 8×, 16×, etc. Zoom-out button 204 may perform the inverse function of zoom-in button 202 (i.e., zoom-out). Pressing zoom-out button 204 can decrease the zoom from, for example, 4× to 2× or 2× to 1×. Although the examples above assume a 2× zoom factor, any zoom factor can be chosen by the user (see, e.g., preference 323 of FIG. 3 below), and/or there can be system default settings which can be used to determine how much zooming should occur prior to any customization by the user.

In some embodiments, user-interface 200 can include smart-zoom toggle button 206. Smart-zoom toggle button 206 can allow a user to enable or disable a smart-zoom feature. A smart-zoom feature may, according to some embodiments, zoom in on an area of the image associated with one or more focus points that may be determined from metadata associated with the image. This can occur, for example, when a user presses zoom-in button 202, and/or it may occur by default when the user selects an image to view (e.g., an image processing system may routinely display an image as a zoomed in image, rather than as the entire image that was captured by the photographer). The focus point or points can be saved along with the image as metadata when the image is captured (e.g., by imager 103 of FIG. 1). When smart-zoom toggle button 206 is disabled, on the other hand, pressing zoom-in button 202 may simply zoom to the center of image 230. Other zoom options may be available when smart-zoom toggle button 206 is disabled. For example, a user may use a mouse gesture (e.g., clicking a button or using a scroll wheel) to zoom in on a particular area of image 230. In some embodiments, the smart-zoom feature can be automatically enabled if focus point metadata is available for a particular image being displayed and/or automatically disable if focus point metadata is not available for a particular image being displayed.

User-interface 200 may also include auto-zoom toggle button 208. Auto-zoom toggle button 208 can allow a user to choose to automatically zoom to a predetermined level. For example, when auto-zoom toggle button 208 is enabled, all images may be displayed at 2× by default. When auto-zoom toggle button 208 is not enabled, the default display mode for images may be "scaled-to-fit," which may display image 230 in full (e.g., at the zoom level that causes the entire image as captured by the photographer to fill window 232 in at least one dimension). As an example, when auto-zoom toggle button 208 is enabled, a user scrolling through a set of images one-by-one may be presented with each image at the default zoom factor. However, if auto-zoom toggle button 208 is disabled, the user may be presented with, for instance, a view of each image scaled-to-fit the provided window. Moreover, even if a default setting is selected, each image may be viewed at a different zoom level based on various factors or image metadata (e.g., orientation, etc.).

In some embodiments, focus point overlay toggle button 210 may also be included in user-interface 200. Enabling focus point toggle button 210 can turn on a focus point overlay 220. Focus point overlay 220 may represent at least a portion of a focus point array associated with the camera used to capture image 230 (e.g., imager 103 of FIG. 1). As shown in FIG. 2, for example, focus point overlay 220 may include forty-five focus points, each of which may be associated with a particular potential focus point available to the imager used to capture image 230. However, an imager can have any suitable number of potential focus points. One or more highlighted focus points 222 of overlay 220 may represent the one or more actual focus points that may have been used by the imager to capture image 230. Each focus point of overlay 220 may be displayed with respect to an image in any suitable way (e.g., as translucent, transparent, or opaque boxes or any other suitable shape that may be positioned appropriately with respect to the displayed image), and each highlighted focus point 222 can be highlighted or otherwise distinguished from other focus points in any suitable fashion to show the user which particular focus point or focus points of overlay 220 were used to capture the image (e.g., each highlighted focus point 222 may be of a different color, translucency, size, or shape than non-highlighted focus points). The number and position of focus points in the array depicted by overlay 220 as well as the number and position of highlighted focus points 222 may be determined by focus point metadata associated with the image being displayed in window 232. In some embodiments, focus point toggle button 210 may be configured to only display the one or more highlighted focus points 222 and not any other focus points of overlay 220.

Figure 6:
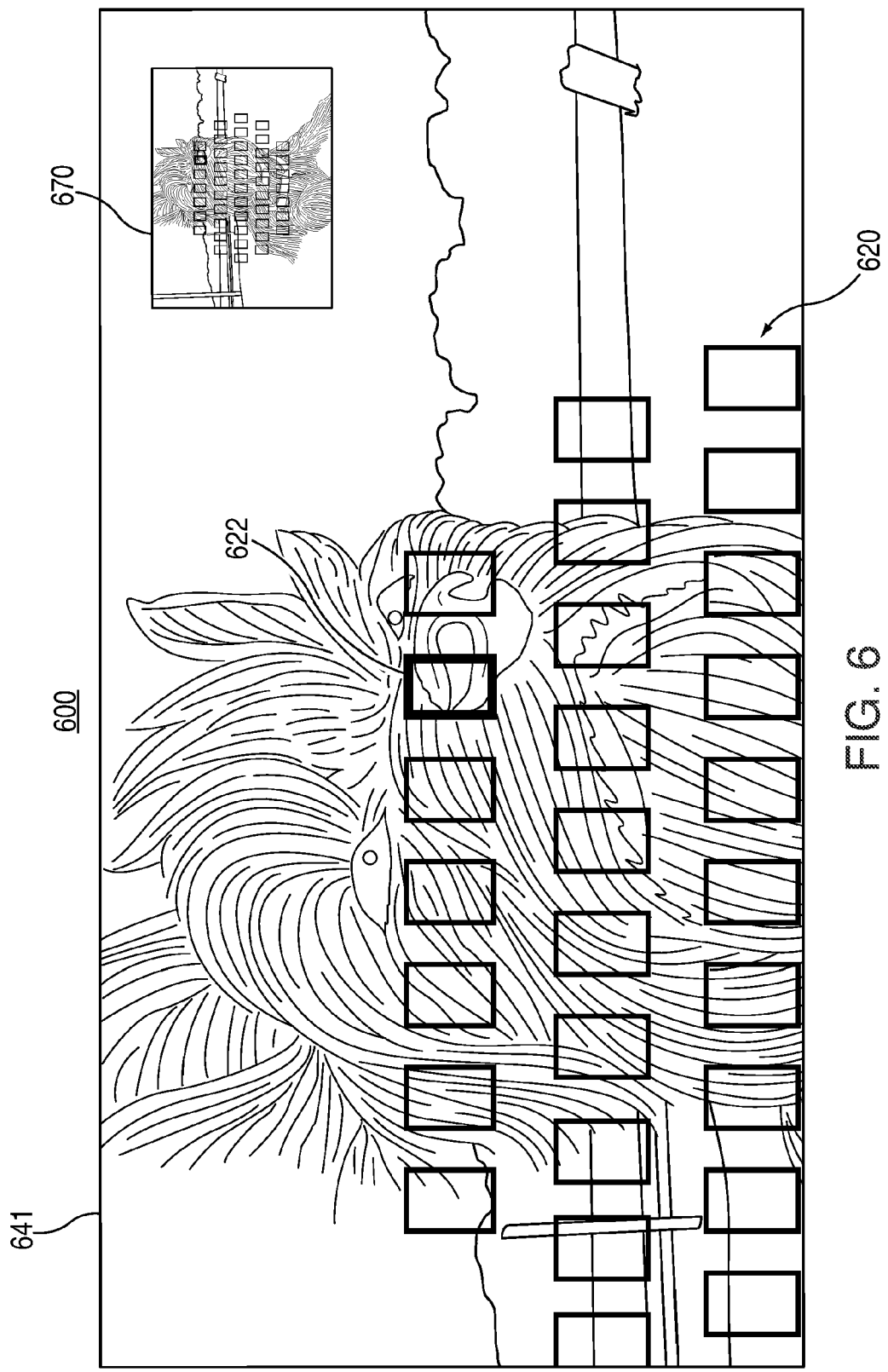
FIG. 6 is a view of a display window of an image processing system showing a zoomed-in image with a full-image thumbnail according to at least one embodiment.

According to further embodiments, user-interface 200 may also include thumbnail toggle button 212. Enabling thumbnail toggle button 212 may generate a fully zoomed-out, but reduced size version of image 230. That thumbnail image may be displayed along with a zoomed-in portion of the image (see, e.g., thumbnail image 670 of FIG. 6 below). Alternatively, thumbnail toggle button 212 may be configured to generate a zoomed-in portion of image 230 as a thumbnail image that may be displayed along with a fully zoomed-out version of image 230 (e.g., the opposite of what is shown in FIG. 6).

User-interface 200 can also include image array-view toggle button 214. When image array-view toggle button 214 is enabled, editing/viewing window 232 may display a view where a user can quickly scan a number of images at once to decide whether to retain or delete one or more of them (see, e.g., FIG. 7).

Figure 3:
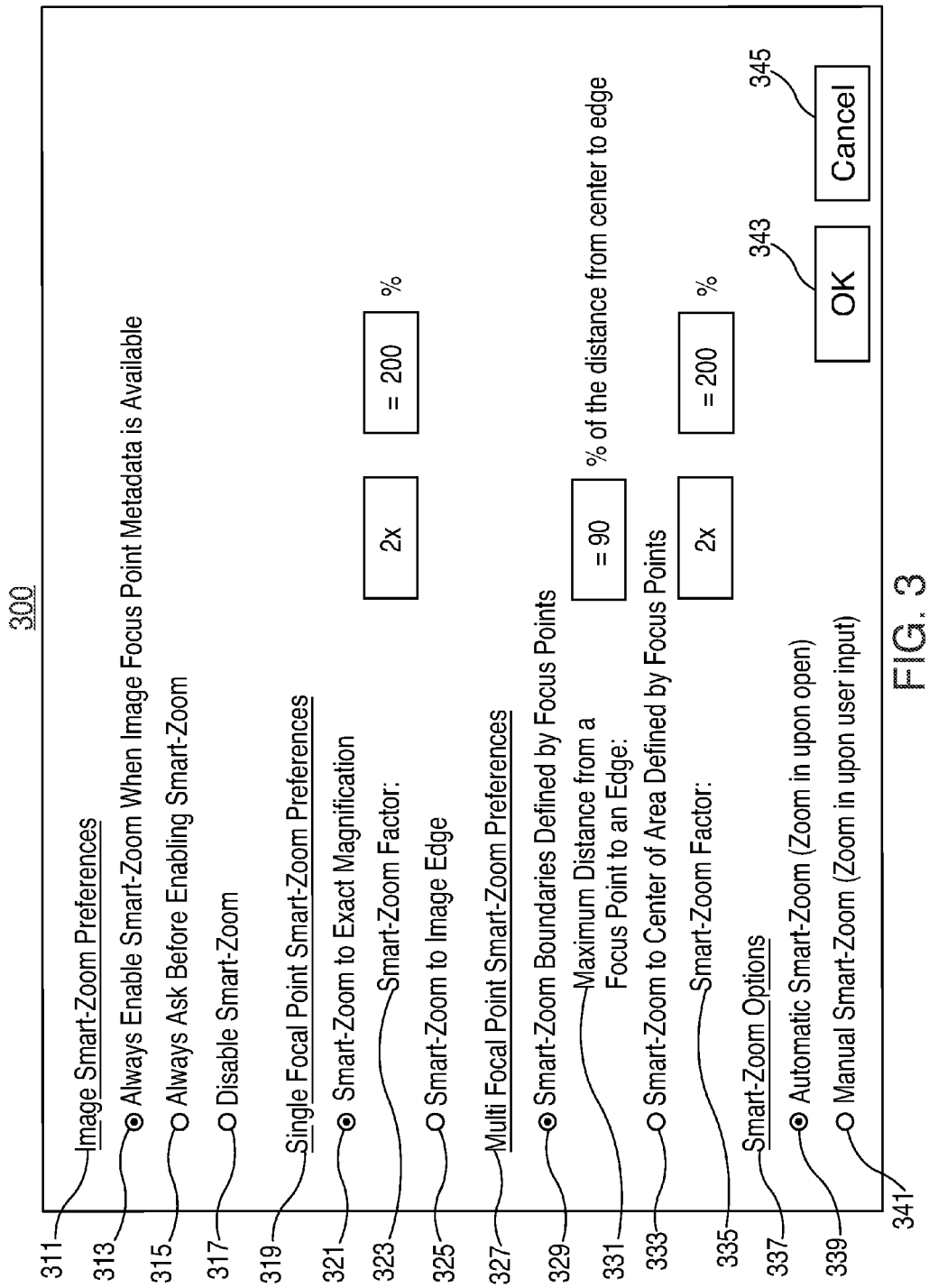
FIG. 3 is a user-interface of an image processing system for setting smart-zoom user preferences according to at least one embodiment.

FIG. 3 is an example of a user-interface 300 that may be provided by an image processing system (e.g., system 100) to a user for setting smart-zoom user preferences according to some embodiments. Preferences chosen in user-interface 300 may define default behavior for many aspects of an image processing system. Under the Image Smart-Zoom Preferences heading 311, a user may have the option, for example: to choose to always enable smart-zoom when focus point metadata is available at preference 313; to have the system always ask before enabling smart-zoom at preference 315; or to disable smart-zoom at preference 317.

Under the Single Focus Point Smart-Zoom Preferences heading 319, a user may have the option, for example: to smart-zoom to an exact zoom level at preference 321 (e.g., to a specific smart-zoom factor, such as 2× or 200%, that may be chosen at preference 323); or to smart-zoom to image edge at preference 325. Choosing the option smart-zoom to image edge preference 325 may be useful if a focus point of the image is off-center, at least by a particular distance. In that case, the image's focus point may be chosen as the smart-zoom point and the image may be zoomed to a level that maximizes the viewable area of the image while maintaining the focus point in the center of the viewing window. Alternatively, in some embodiments, the smart-zoom point may be chosen such that, at a particular zoom factor (e.g., 1× or 2×), the focus point is as close to the center of the zoomed-in image as possible while also filling the viewing window in at least one direction with image content.

Options under the Multi Focal Point Smart-Zoom Preferences heading 327 may allow a user to decide how to perform a smart-zoom function on images with more than one utilized or activated focus point (e.g., as may be indicated by focus point metadata associated with the image). One option may be to smart-zoom to boundaries defined by focus points at preference 329. In that case, the image may be zoomed to a level that does not place any of those focus points outside the image viewing window. A user may define the maximum or minimum distance that a focus point may be from an edge of the viewing window at preference 331 for any given focus point (e.g., 90% of the distance from the center of the image to the edge). A de-facto smart-zoom point of the image may be established and may then be positioned at the center of the image viewing window of the zoomed-in image. Further zooming may, for example, zoom in on the de-facto smart-zoom point. Otherwise, a user may choose the option to smart-zoom to the center of the area defined by the multiple focus points at preference 333 with a particular zoom factor at preference 335 (e.g., 2× or 200%). In that instance, the system may base the de-facto smart-zoom point for a captured image on an average location that exists between each of the activated or utilized focus points designated by the camera in the metadata of that image. Any suitable method of determining the center of the focus points, such as a least squares approach, may also be used to determine the de-facto smart-zoom point.

A user may also choose from one or more automatic smart-zoom options 337. For example, a user may choose automatic smart-zoom preference 339 to automatically view a smart zoomed-in image by default or manual smart-zoom preference 341 to view an image in a scaled-to-fit screen view or any other suitable view by default.

Buttons OK 343 and Cancel 345 may be utilized by a user to save or cancel the chosen options of interface 300, respectively.

The various preferences shown in FIG. 3 are for purposes of example only. Various preferences may be added or removed from the settings of user-interface 300.

Figure 4:
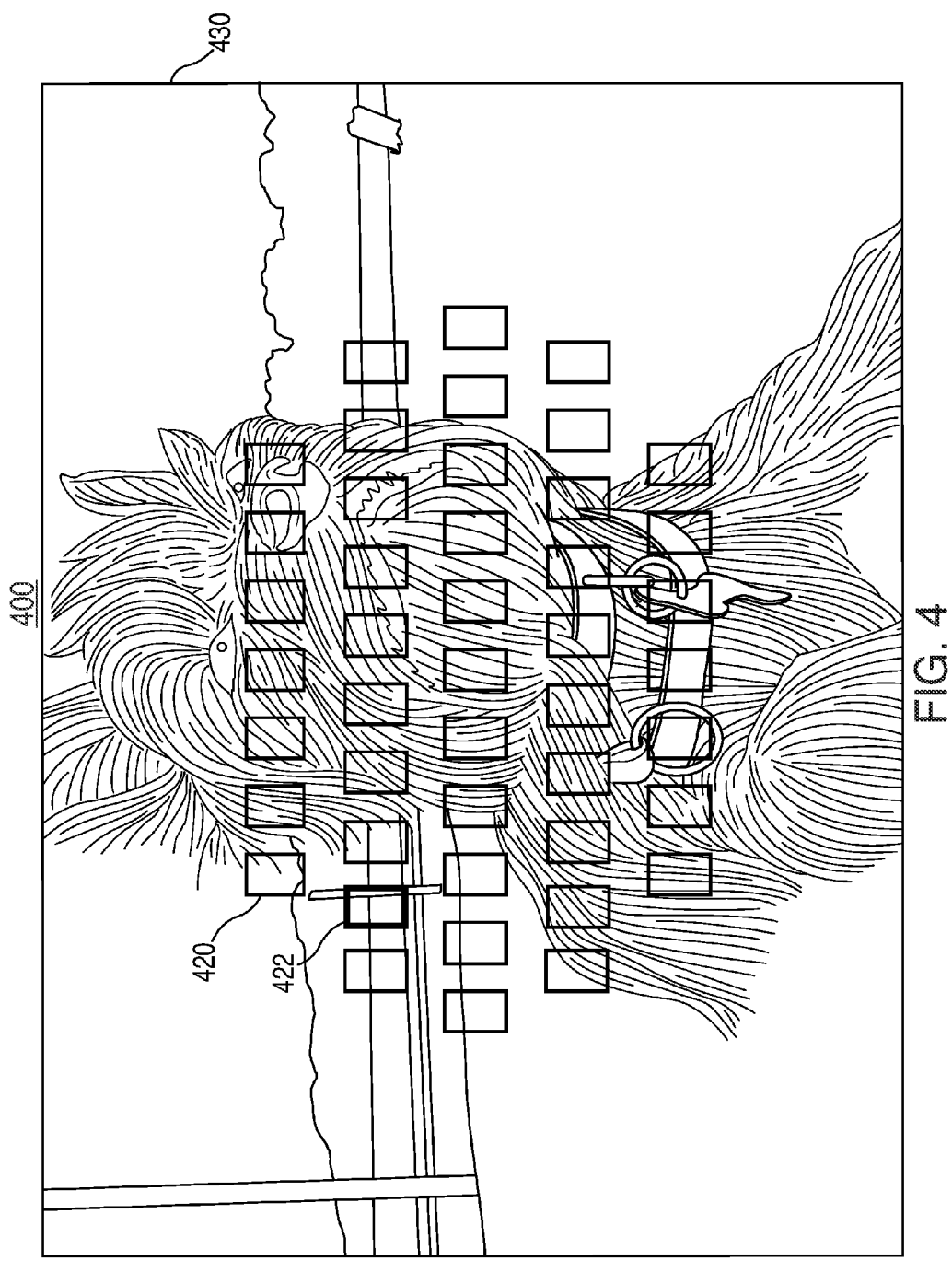
FIG. 4 is a view of a display window of an image processing system showing a full image with a focus point overlay according to at least one embodiment.

FIG. 4 is a view of an exemplary display window 400 that may be provided by an image processing system (e.g., system 100) to a user with in a viewing mode for an image 430 in which the user preferences may be set to scaled-to-fit zoom with a focus point overlay 420 according to at least some embodiments. As shown in FIG. 4, for example, image 430 may be provided at scaled-to-fit zoom, such that image 430 is shown in full as large as possible within window 400 without sacrificing any portion of the image. Focus point overlay 420 may be superimposed over image 430 and a highlighted focus point 422 may indicate the focus point of image 430 utilized by a camera when capturing image 430 (e.g., imager 103 of FIG. 1). Focus point overlay 420 may be toggled on and off using, for example, focus point toggle button 210 of FIG. 2. As shown in FIG. 4, highlighted focus point 422 is clearly not positioned over the probable intended subject of image 430 (i.e., the face of the depicted dog).

Viewing an image in this way may allow a user to quickly ascertain whether the portion of the image that is in-focus is located where an intended subject of the image is positioned. For instance, because highlighted focus point 422 is not positioned over the intended subject of image 430 (e.g., as assumed to be the face of the depicted dog), a user can reasonably delete image 430 because the subject of the image is very likely out of focus and the user may then move on to the next image without spending the time to zoom in and observe the finer details of the deleted image. This can significantly reduce the time and effort required to review a set of images.

Figure 5A:
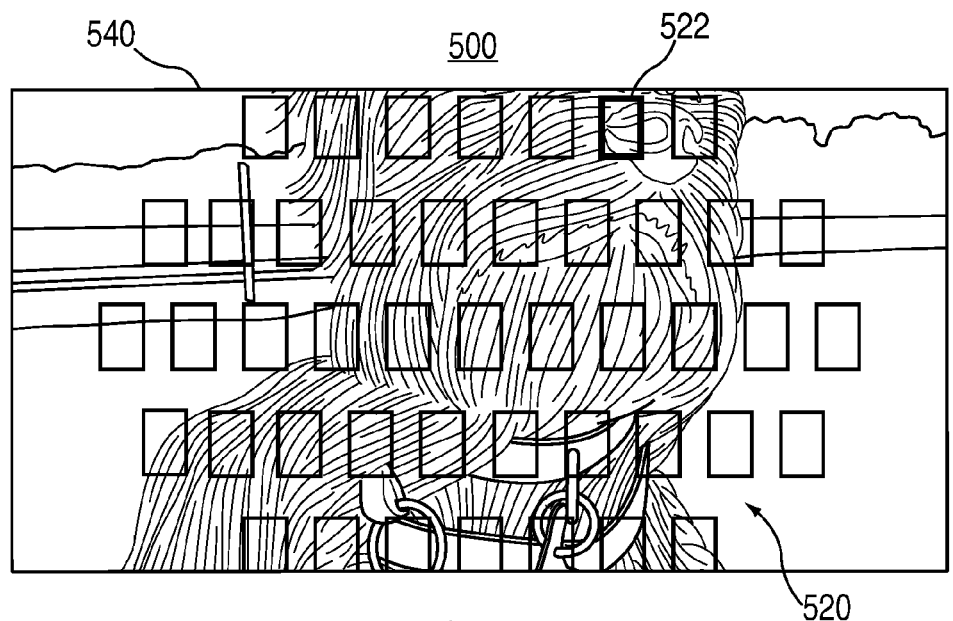
FIG. 5A is a view of a display window of an image processing system showing a zoomed-in image with smart-zoom disabled according to at least one embodiment.

FIG. 5A is a view of an exemplary display window 500 that may be provided by an image processing system (e.g., system 100) to a user with in a viewing mode for a zoomed-in image 540 with smart-zoom disabled according to some of the embodiments described above. FIG. 5A may show a typical result from the use of conventional zooming techniques, in which the system may simply zoom in on the center of the image. As shown in FIG. 5A, because highlighted focus point 522 of focus point overlay 520 is off-center, and because zoomed-in image 540 may be missing part of the intended subject of the image, it can be difficult to tell whether the subject is in focus.

Figure 5B:
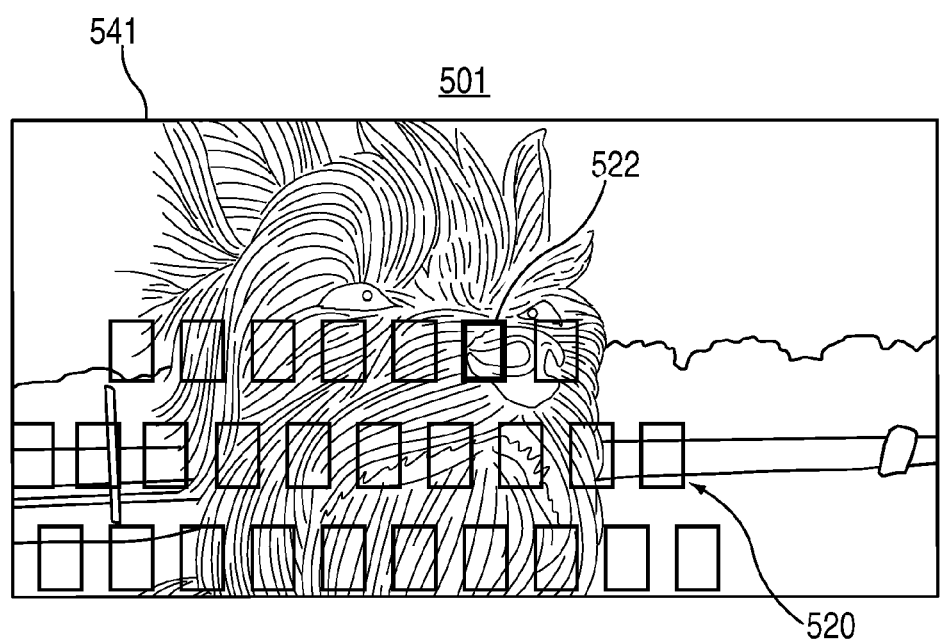
FIG. 5B is a view of a display window of an image processing system showing a zoomed-in image with smart-zoom enabled according to at least one embodiment.

FIG. 5B, on the other hand, is a view of an exemplary display window 501 that may be provided by an image processing system (e.g., system 100) to a user with in a viewing mode for a zoomed-in image 541 with smart-zoom enabled according to at least some of the embodiments described above. Here, highlighted focus point 522 of focus point overlay 520 may be shown in the center of zoomed-in image 541. It is easy to tell that the utilized focus point of the captured image was correctly positioned on the intended subject of interest. As shown in FIG. 5B, for example, because image 541 is zoomed-in to the highlighted focus point 522, no time may need to be wasted panning to that position to observe the details of image 541. The high resolution images captured by modern cameras can make panning on a zoomed-in image very difficult and time consuming. The viewing mode of display window 501 may allow a user to quickly ascertain: (1) whether the intended subject was positioned at the focus point of the image; and (2) whether the subject is actually in focus. This can significantly simplify the entire process for the user that is reviewing and editing one or more images. It is to be understood, that in some embodiments, highlighted focus point 522 and/or the remainder of overlay 520 need not be displayed in window 500 and/or window 501.

FIG. 6 is a view of an exemplary display window 600 that may be provided by an image processing system (e.g., system 100) to a user with in a viewing mode for a zoomed-in image 641 with a full-image thumbnail according to at least some of the embodiments described above. Zoomed-in image 641 may be an example of a zoomed-in image with smart-zoom enabled. Highlighted focus point 622 of focus point overlay 620 may be positioned in essentially the center of window 600 along with zoomed-in image 641. Thumbnail image 670 may also be provided to display a fully zoomed-out, but reduced-size copy of the original version of image 641. Thumbnail image 670 may be positioned in a corner of zoomed-in image 641 or in any other suitable way with respect to zoomed-in image 641 in order to display the full context of zoomed-in image 641 without disrupting the user's view of zoomed-in image 641. In some embodiments, thumbnail image 670 may be positioned in a separate window from window 600. Thumbnail toggle button 212 of FIG. 2, for example, may be used to toggle on and off the display of thumbnail image 670. This thumbnail viewing feature can add a further element of convenience to the viewing mode shown in FIG. 6, as well as those previously described. Not only can a user quickly and easily ascertain whether the utilized focus point was located on the intended subject of the image and whether the intended subject is actually in focus, but the user can also determine whether the subject matter of the image as a whole is desirable. Alternatively, in some embodiments, thumbnail image 670 may be configured to display the smart-zoomed in portion of image 641 and window 600 may be configured to display the original version of image 641 (e.g., image 641 fit-to-scale within window 600 and image 641 smart-zoomed within thumbnail image 670). It is to be understood, that in some embodiments, highlighted focus point 622 and/or the remainder of overlay 620 need not be displayed in window 600 and/or thumbnail 670.

FIG. 7 is a view of an exemplary display window 700 that may be provided by an image processing system (e.g., system 100) to a user for reviewing multiple images at once in an array view mode with focus point overlays according to at least some of the embodiments. As shown in FIG. 7, for example, a user can quickly scan a number of images 730 (e.g., images 730a-730i) with respective focus overlays 720 (e.g., overlays 720a-720i) having one or more respective highlighted focus points 722 (e.g., highlighted focus points 722a-722i) and decide whether to retain or delete each one of images 730. For example, a user can determine that images 730a, 730c, 730h, and 730i with respective highlighted focus points 722a, 722c, 722h, and 722i are worth retaining because those focus points 722 are correctly positioned over the intended subject of the images 730. Images 730b and 730d-730g with respective highlighted focus points 722b and 722d-722g may not be focused correctly because the highlighted focus points 722 are not correctly positioned over the intended subject of the images 730. Each one of retain check boxes 770 (e.g., retain check boxes 770a-770i) may be marked by the user to determine which of images 730a-730i from the array of display window 700 are to be kept for further viewing and/or editing. The use of retain boxes 770 may be provided as an additional feature to provide a user with further efficiencies in reviewing a set of images. In other embodiments, rather than displaying each image 730 in the array of images of window 700 in full, the image processing system may be configure to display each image 730 in the array as smart-zoomed. It is to be understood, that in some embodiments, one or more highlighted focus points 722 and/or the remainder of one or more overlays 720 need not be displayed in window 700.

Figure 8A:
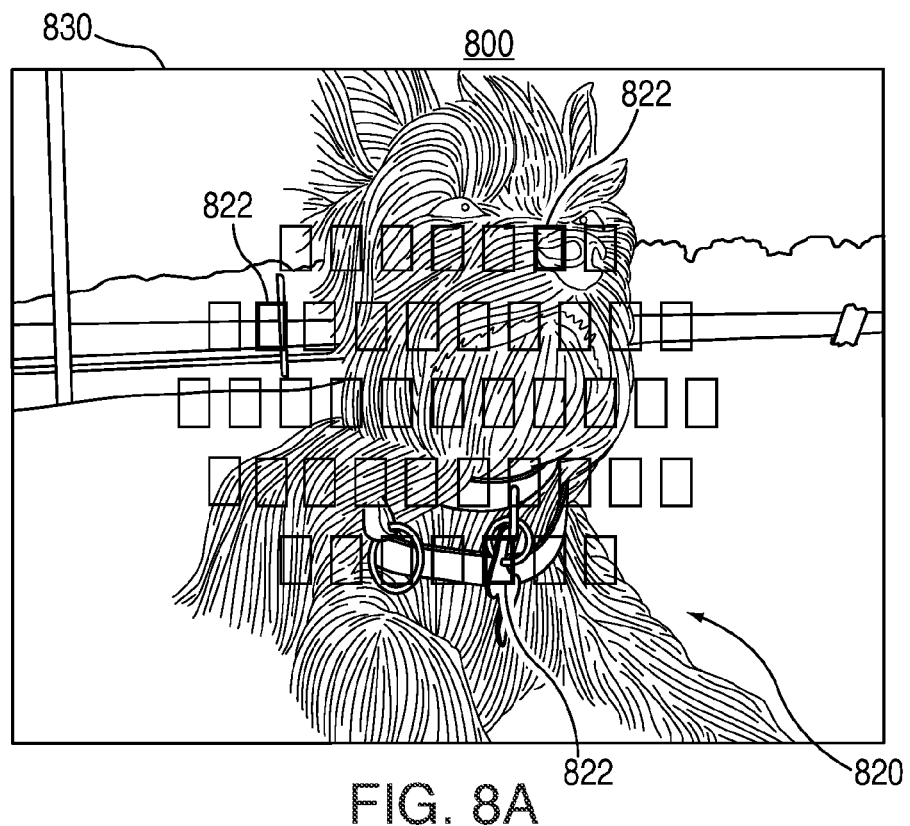
FIG. 8A is a view of a display window of an image processing system showing a full image with multiple focus points according to at least one embodiment.

FIG. 8A is a view of an exemplary display window 800 that may be provided by an image processing system (e.g., system 100) to a user for reviewing an image 830 as scaled-to-fit with multiple highlighted focus points 822 with smart-zoom disabled according to at least some of the embodiments disclosed herein. Scaled-to-fit image 830 may be displayed with focus point overlay 820 that may have multiple highlighted focus points 822. The number and position of each focus point of overlay 820 may be determined by metadata associated with image 830.

Figure 8B:
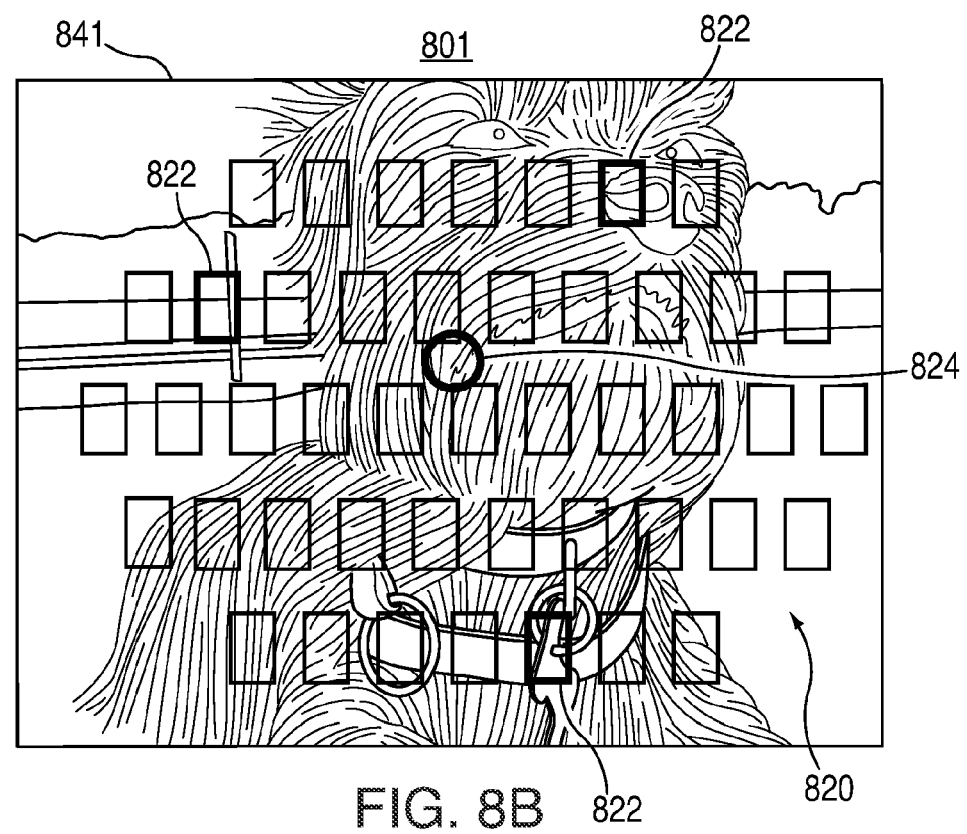
FIG. 8B is a view of a display window of an image processing system showing a zoomed-in image with multiple focus points according to at least one embodiment.

FIG. 8B is a view of an exemplary display window 801 that may be provided by an image processing system (e.g., system 100) to a user for reviewing image 831 with multiple highlighted focus points 822 and smart-zoom enabled according to at least some embodiments. Smart-zoomed image 831 may be displayed with focus point overlay 820 and multiple highlighted focus points 822. A de-facto focus point 824 can be calculated as the approximate center point of highlighted focus points 822 for the purposes of choosing a smart-zoom point. Any suitable method for calculating de-facto focus point 824 may be employed (e.g., a least squares method). A de-facto smart-zoom point 824 may also be calculated by defining a maximum and/or minimum allowed distance from a focus point to an edge of window 801 (e.g., as described in reference to smart-zoom to image edge option 331 of FIG. 3 above). In some embodiments, a user may also be able to jump between highlighted focus points 822 using, for example, a button or a keyboard shortcut or any other suitable input mechanism. A user may also be presented with the option to choose a particular highlighted focus point 822 as the de-facto smart-zoom point. It is to be understood, that in some embodiments, de-facto smart-zoom point 824 and/or highlighted focus points 822 and/or the remainder of overlay 820 need not be displayed in window 800 and/or window 801.

Figure 9:
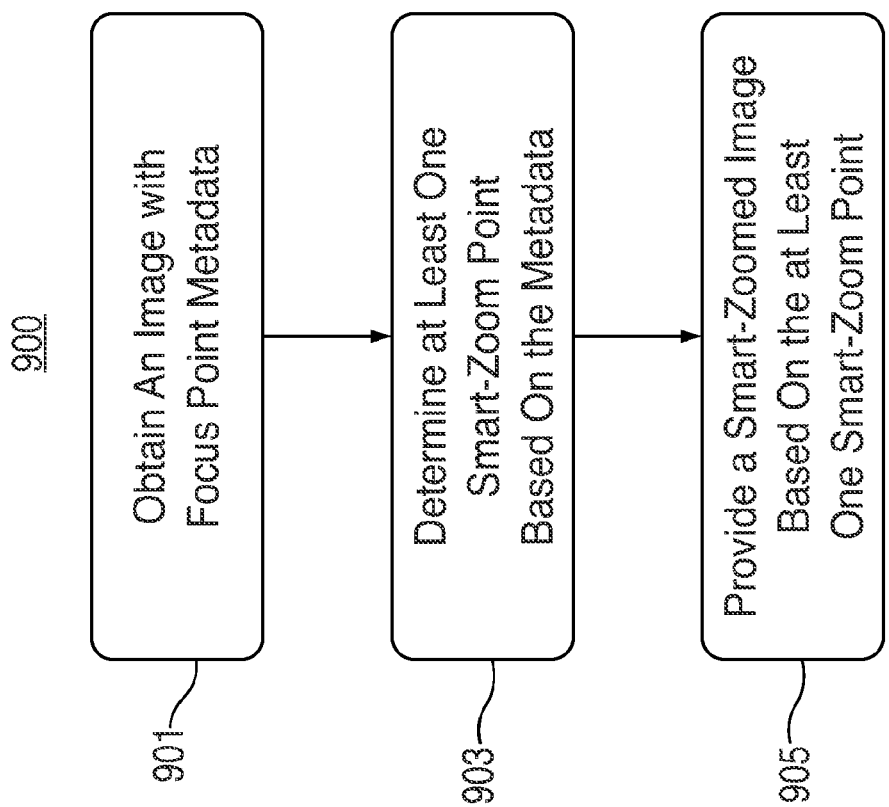
FIG. 9 is a flow chart of a process for performing image zooming according to at least one embodiment.

FIG. 9 is a flow chart of a process 900 for performing image zooming according to at least some embodiments. In particular, process 900 may be directed to obtaining an image with associated focus point metadata and performing a smart-zoom function based on the one or more utilized focus points indicated by the focus point metadata. An image with associated focus point metadata may be obtained at step 901. For example, an image processing system may access or otherwise obtain at least one image and focus point metadata associated with that image from any suitable image source, such as imager 103. In some embodiments, an image may be accessed from one source and the associated metadata may be accessed from another source. For example, an image and/or associated metadata may be imported from a digital camera (e.g., imager 103 of FIG. 1), downloaded from the internet, or imported from an external memory device to a system (e.g., system 100 of FIG. 1).

Next, at step 903, at least one smart-zoom point may be determined based on the metadata. For example, an image processing system may determine at least one smart-zoom point by any suitable method discussed above. For example, a smart-zoom point may be determined to coincide with a single focus point indicated by the metadata or a smart-zoom point may be determined to have a particular relationship to several focus points indicated by the metadata. In some embodiments, a de-facto smart-zoom point may be calculated based at least on multiple focus points indicated by the focus point metadata.

At step 905, the image may be smart-zoomed based on the at least one smart-zoom point. For example, an image processing system may display within a window a zoomed portion of the image and the center of the zoom portion of the image may be based on the at least one smart-zoom point. In some embodiments, the center of the zoom portion of the image may be the position of the smart-zoom point. The zoom portion of the image may be at any suitable zoom factor. A thumbnail of the full image may be displayed along with the smart-zoomed image to a user. The system may be configured to toggle between displaying the smart-zoomed image and the full image to the user (e.g., within a particular window). In some embodiments, process 900 may be performed simultaneously or serially for multiple images, and multiple images may be displayed in an array to the user at the same time. Each of the images in the array may be displayed as smart-zoomed. In some embodiments, process 900 may also include generating an overlay for an image based on the focus point metadata associated with that image. The overlay may be displayed along with the full image and/or with the smart-zoomed image. The overlay may include a representation of at least one focus point utilized by an imager to capture the image and/or a representation of at least one potential focus point that may have been used by the imager to capture the image.

Figure 10:
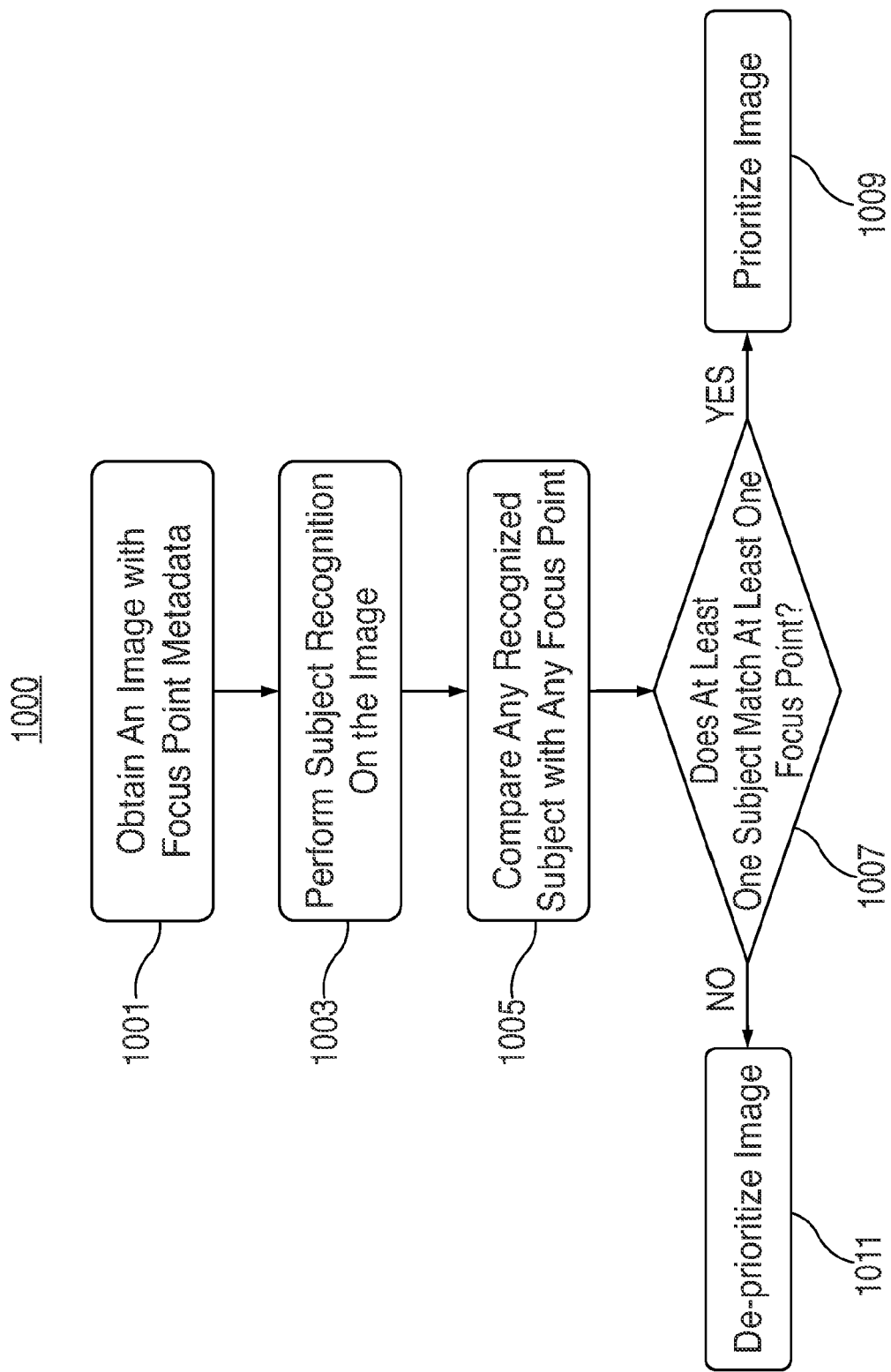
FIG. 10 is a flow chart of a process for performing image zooming according to at least one embodiment.

FIG. 10 is a flow chart of a process 1000 for performing image zooming according to at least some embodiments. In particular, process 1000 may be directed to performing smart-zooming on an image based at least on comparing focus point metadata associated with the image and subject recognition data. An image with associated focus point metadata may be obtained at step 1001. For example, an image processing system may access or otherwise obtain at least one image and focus point metadata associated with that image from any suitable image source, such as imager 103. In some embodiments, an image may be accessed from one source and the associated metadata may be accessed from another source. For example, an image and/or associated metadata may be imported from a digital camera (e.g., imager 103 of FIG. 1), downloaded from the internet, or imported from an external memory device to a system (e.g., system 100 of FIG. 1).

Next, a subject recognition procedure may be performed on the image at step 1003. For example, an image processing system may be configured to recognize a particular subject within an image and its particular position with the image (e.g., by utilizing a subject recognition algorithm). In some embodiments, an image processing system may be configured to detect the position of a subject's face within a captured image (e.g., as provided by the face recognition feature available in iPhoto™ by Apple Inc. of Cupertino, Calif.). In some embodiments, an image processing system may be configured to detect a certain type of object, which may be determined by a user. For example, a user my instruct an image processing system to recognize only the faces of human subjects, or only automobiles, or only red balls, or only green balls, or any particular subject or set of particular subjects that a user may choose. Therefore, a system may be configured to recognize a particular subject that may likely be the intended subject of an image.

At step 1005, the focus point data obtained at step 1001 may be compared with the subject recognition data obtained at step 1003. For example, an image processing system may compare the position of one or more focus points of the image, which may be indicated by the focus point metadata, with the position of one or more subjects recognized. Next, at step 1007, it may be determined from the comparison whether the position of at least one recognized subject matches or is close to the position of at least one focus point. Generally, if at least one of the image's focus points overlaps with or is within a particular distance from at least one recognized subject, there may be a high probability that the subject or subjects may be in-focus within the image. On the other hand, if a recognized subject does not overlap or is not close to any focus points, then the recognized image subject may most likely not be in focus.

Based on the determination at step 1007, process 1000 may either advance to step 1009 or step 1011. For example, if it is determined at step 1007 that at least one recognized subject matches at least one focus point, then process 1000 may proceed to step 1009 and the image may be prioritized (e.g., for further viewing and/or editing). If, however, it is determined at step 1007 that no recognized subject matches any focus point, then process 1000 may advance to step 1011 and the image may be de-prioritized (e.g., from further viewing and/or editing). For example, prioritized images may be ordered for presentation to a user before or after de-prioritized images (e.g., in an array of images, as shown in FIG. 7 for example).

It is to be understood that the steps shown in each one of processes 900 and 1000 of FIGS. 9 and 10, respectively, are merely illustrative and that existing steps may be modified or omitted, additional steps may be added, and the order of certain steps may be altered.

Moreover, the processes described with respect to FIGS. 9 and 10, as well as any other aspects of the invention, may each be implemented by software, but may also be implemented in hardware, firmware, or any combination of software, hardware, and firmware. They each may also be embodied as computer-readable code recorded on a computer-readable medium. The computer-readable medium may be any data storage device that can store data which can thereafter be read by a computer system. Examples of the computer-readable medium may include, but are not limited to, read-only memory, random-access memory, flash memory, CD-ROMs, DVDs, magnetic tape, and optical data storage devices (e.g., memory 109 that may be accessible by processor 101 of FIG. 1). The computer-readable medium can also be distributed over network-coupled computer systems so that the computer-readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. An image processing system comprising:
   a display; and
   a processor coupled to the display and a memory device containing instructions that, when executed by the processor, cause the processor to:
   process focus point metadata associated with an image;

identify a subject within the image based at least in part on a facial recognition algorithm;
compare a location of a focus point of the image as defined by the focus point metadata with a location of the subject as identified by the facial recognition algorithm, to provide a result;
generate a priority for the image based on the result; and
manipulate the image on the display based at least in part on the priority.

2. The image processing system of claim 1, wherein the priority is calculated based on a function of a distance between the location of the focus point and the location of the subject.

3. The image processing system of claim 1, wherein manipulating the image includes using a smart-zoom function based on the focus point metadata.

4. The image processing system of claim 3, wherein the smart-zoom function comprises:
determining a smart-zoom point based at least on a single focus point from the focus paint metadata; and
providing a zoomed-in portion of the image about the smart-zoom point on the display.

5. The image processing system of claim 4, wherein the determining the smart-zoom point further includes matching the single focus point from the focus point metadata with the subject identified within the image.

6. The image processing system of claim 1, wherein processing the focus point metadata includes processing one focus point.

7. The image processing system of claim 1, wherein processing the focus point metadata includes processing a plurality of focus points.

8. The image processing system of claim 1, wherein manipulating the image includes superimposing a focus point overlay on the image on the display based on the focus point metadata.

9. The image processing system of claim 1, wherein the generating a priority includes determining that the focus point, included within the focus point metadata, used to focus the image is within a pre-determined distance of the subject identified within the image.

10. A method comprising:
processing, using one or more processors, focus point metadata associated with an image to determining a focus point of the image;
identifying, using the one or more processors, a subject within the image based at least in part on a subject recognition algorithm;
comparing a location of the focus point with a location of the subject as identified by the subject recognition algorithm, to provide a result;
generating a priority for the image based on the result; and
manipulating, using the one or more processors, the image based at least in part on the priority.

11. The method of claim 10, wherein manipulating the image includes using a smart-zoom function based at least in part on the focus point of the image.

12. The method of claim 11, wherein the smart-zoom function comprises:
determining a smart-zoom point based at least on multiple focus points from the focus point metadata; and
providing a zoomed-in portion of the image about the smart-zoom point.

13. The method of claim 11, wherein the smart-zoom function includes determining a smart-zoom point including matching one or more focus points from the focus point metadata with the subject identified within the image.

14. The method of claim 10, wherein generating the priority includes prioritizing the image if the focus point is within a pre-determined distance of the subject identified within the image.

15. The method of claim 14, wherein generating the priority includes de-prioritizing the image if the focus point is outside the pre-determined distance from the subject identified within the image.

16. The method of claim 10, wherein identifying the subject within the image includes using a facial recognition algorithm to identify at least one face within the image.

17. The method of claim 10, wherein identifying the subject within the image includes receiving a user input to instruct the subject recognition algorithm to recognize a particular type of subject.

18. A non-transitory computer-readable storage medium comprising instructions that, when executed by a processor within a computing device, cause the computing device to perform operations comprising:
processing focus point metadata associated with an image to determining a focus point of the image;
identifying a subject within the image based at least in part on a subject recognition algorithm;
comparing a location of the focus point with a location of the subject as identified by the subject recognition algorithm, to provide a result;
generating a priority for the image based on the result; and
manipulating the image based at least in part on the priority.

19. The non-transitory computer-readable storage medium of claim 18, wherein manipulating the image includes using a smart-zoom function based at least in part on the focus point of the image.

20. The non-transitory computer-readable storage medium of claim 19, wherein the smart-zoom function comprises:
determining a smart-zoom point based at least on multiple focus points from the focus point metadata; and
providing a zoomed-in portion of the image about the smart-zoom point.

21. The non-transitory computer-readable storage medium of claim 19, wherein the smart-zoom function includes determining a smart-zoom point including matching one or more focus points from the focus point metadata with the subject identified within the image.

22. The non-transitory computer-readable storage medium of claim 18, wherein generating the priority includes prioritizing the image if the focus point is within a pre-determined distance of the subject identified within the image.

23. The non-transitory computer-readable storage medium of claim 18, wherein identifying the subject within the image includes using a facial recognition algorithm to identify at least one face within the image.

24. The non-transitory computer-readable storage medium of claim 18, wherein identifying the subject within the image includes using user input to instruct the subject recognition algorithm to recognize a particular type of subject.

* * * * *

UNITED STATES PATENT AND TRADEMARK OFFICE
CERTIFICATE OF CORRECTION

PATENT NO.        : 9,001,230 B2
APPLICATION NO.   : 14/065149
DATED             : April 7, 2015
INVENTOR(S)       : Jirman It is certified that error appears in the above-identified patent and that said Letters Patent is hereby corrected as shown below:

In the claims

Column 13, line 20, Claim 4, delete "paint" and insert --point--, therefor

Signed and Sealed this
Twenty-ninth Day of December, 2015

Michelle K. Lee
*Director of the United States Patent and Trademark Office*